J. STERBENZ.
ANIMAL TRAP.
APPLICATION FILED APR. 18, 1919.
1,307,763.
Patented June 24, 1919.
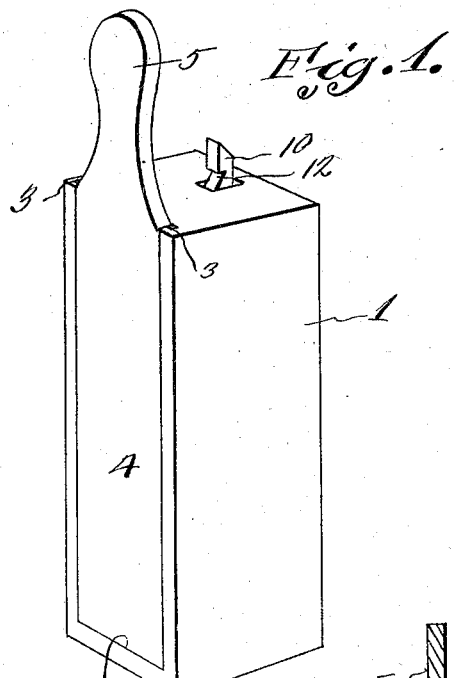
Fig. 1.
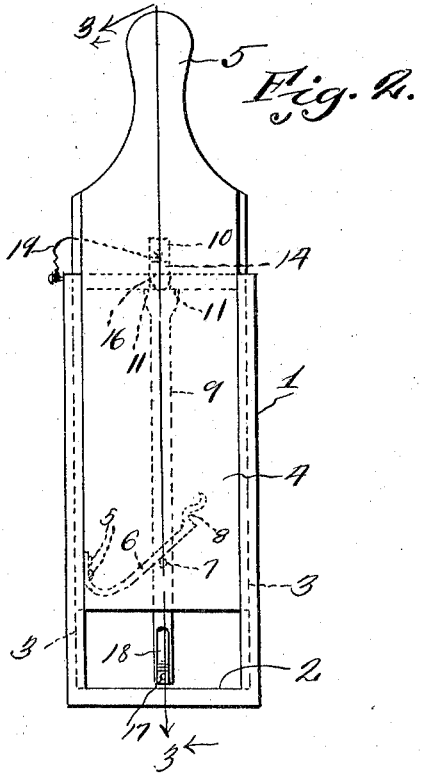
Fig. 2.
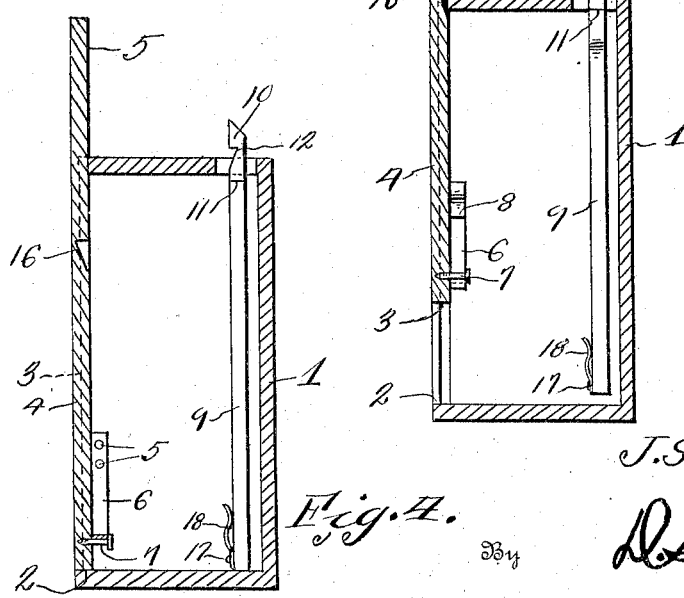
Fig. 3.
Fig. 4.
Inventor
J. Sterbenz
By D. Swift & Co.
Attorneys

UNITED STATES PATENT OFFICE.

JOSEPH STERBENZ, OF NASHWAUK, MINNESOTA.

ANIMAL-TRAP.

1,307,763.　　　　Specification of Letters Patent.　　Patented June 24, 1919.

Application filed April 18, 1919. Serial No. 291,044.

*To all whom it may concern:*

Be it known that I, JOSEPH STERBENZ, a citizen of the United States, residing at Nashwauk, in the county of Itasca, State of Minnesota, have invented a new and useful Animal-Trap; and I do hereby declare the following to be a full, clear, and exact description of the invention, such as will enable others skilled in the art to which it appertains to make and use the same.

The invention relates to animal traps and has for its object to provide a trap of this character, wherein the cover over the entrance is slidably mounted and the same held in open position by means of a bar the end of which engages the cover and its other end being engaged by a notch of a bait lever, against the action of a spring, said spring being so constructed that when the bait is being placed on the lower end of the bait lever an additional upward movement of the cover will cause the spring to assume a position, whereby the cover will be held open by the spring, thereby preventing the tripping of the trap mechanism and consequent injury to the hand of the operator.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the animal trap, showing the same in closed position.

Fig. 2 is a front elevation of the trap, showing the parts in set positions.

Fig. 3 is a vertical sectional view taken on line 3—3 of Fig. 2, showing the parts in set positions.

Fig. 4 is a similar view to Fig. 1, but showing the parts in operative positions.

Referring to the drawings, the numeral 1 designates a box, which is preferably square in cross section, however it is to be understood that the box may be made in various shapes and sizes. The box is provided with an opening 2 and slidably mounted in grooves 3 is a cover 4, which forms a closure for the trap and which has a handle portion 5 adapted to be grasped by the hand of the operator when it is desired to open or set the trap.

Secured as at 5 to one of the side walls of the box is a leaf spring 6, this leaf spring engages a lug 7 on the inner surface of the cover and forms means whereby the cover is forced downwardly to a closed position when an animal trips the tripping mechanism. However the spring near its end is provided with a notch 8, which receives the lug 7 when the cover is raised to a position above its normal operative position. When the lug 7 is in the notch 8, it will be seen that the cover will be held open, therefore the trap may be easily and quickly baited and there will be no danger of the spring forcing the cover downwardly against the hand.

A bait bar 9 is disposed in the box and has an upper reduced portion 10 which extends through an aperture in the top of the box, said reduced portion forming shoulders 11 which engage the under side of the top so as to limit the upward movement of the bar 9. The reduced portion of the bar is provided with a notch which receives the end 13 of a bar 14, the other end 15 thereof engaging a notch 16 in the rear surface of the cover 4. Secured by means of a rivet 17 to the lower end of the bait bar 9 is a spring 18, which will bind the bait against the bait bar, thereby assuring the tripping of the mechanism when an animal pulls upon the bait. The bar 14 may be secured to the box by means of a string 19 thereby preventing the loss of the same when the mechanism is tripped by an animal.

It will be seen that when the animal pulls upon the bait, that the bar 9 will be rocked which rocking will release the end 13 of the bar 14 and the end 15 will leave the notch 16 as the cover is forced downwardly by the spring 6, thereby closing the cover 4 and trapping the animal.

The invention having been set forth, what is claimed as new and useful is:—

1. An animal trap comprising a box having an opening, a slidable cover slidable in the opening, a spring secured to one of the inner walls of the box and having its free end engaging a lug on the slidable cover, a bait bar vertically disposed in the box and having its upper end extending through an aperture in the top of the box, said cover and the upper end of the bait bar being provided with notches for the reception of ends of a bar whereby the cover will be held in open position against the action of the spring, said bait bar being so mounted in the box that a pull upon the lower end thereof will release the bar which engages the notches of the bait bar and the cover thereby allowing the cover to be closed by the spring.

2. An animal trap comprising a box having a slidable cover in the opening thereof, a spring secured to one of the inner walls of the box and having its free end engaging a lug on the slidable cover for closing the cover, said spring having near its end a notch for the reception of the cover lug when it is desired to lock the cover in an open position, and mechanism whereby the cover will be held in open position against the action of the spring and so constructed that when the animal trips the same the cover will be closed by the action of the spring.

In testimony whereof I have signed my name to this specification in the presence of two subscribing witnesses.

JOSEPH STERBENZ.

Witnesses:
J. W. RING,
R. G. LARSON.

Copies of this patent may be obtained for five cents each, by addressing the "Commissioner of Patents, Washington, D. C."